Nov. 28, 1961   G. AXT   3,010,892
OZONE GENERATING APPARATUS
Filed April 29, 1959   2 Sheets-Sheet 1

INVENTOR.
GÜNTER AXT
BY Hane and Hjaink
ATTORNEYS

Nov. 28, 1961  G. AXT  3,010,892
OZONE GENERATING APPARATUS
Filed April 29, 1959  2 Sheets-Sheet 2
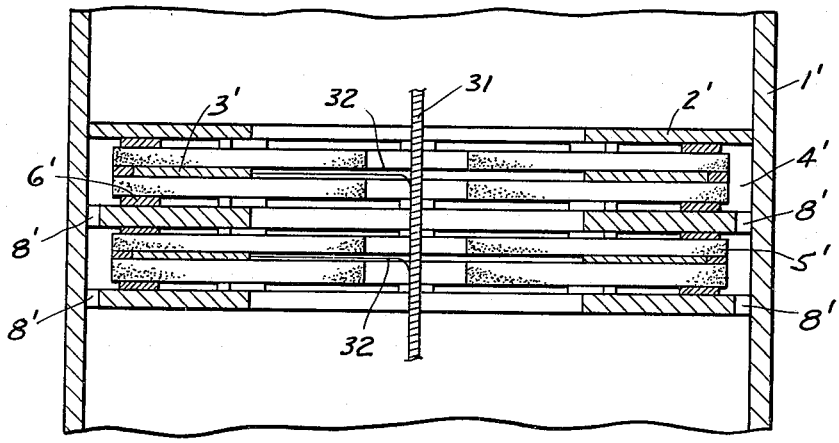
FIG. 3
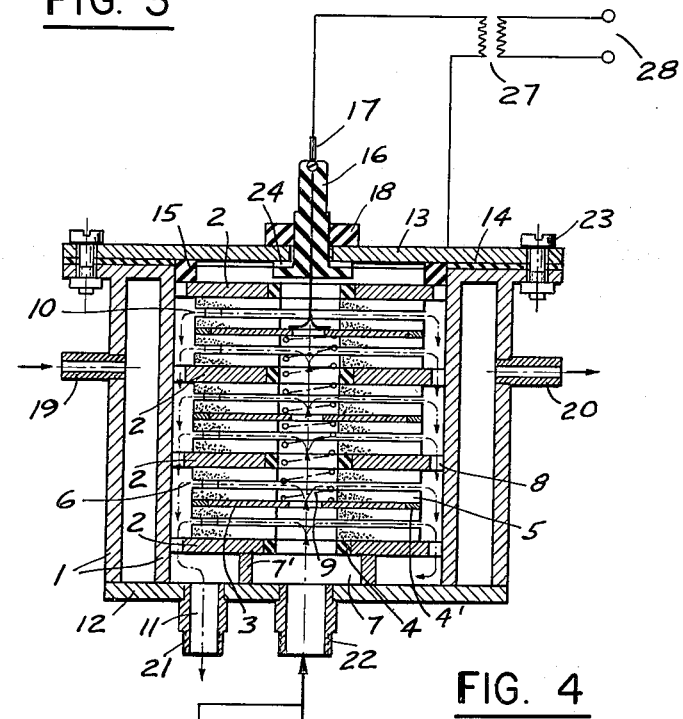
FIG. 4
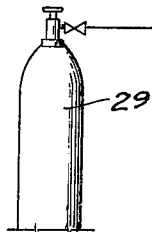
INVENTOR.
GÜNTER AXT
BY Kane and Kydick
ATTORNEYS

United States Patent Office 3,010,892
Patented Nov. 28, 1961

3,010,892
OZONE GENERATING APPARATUS
Günter Axt, 3 Wolfsweg Karlsruhe, Durlach, Germany
Filed Apr. 29, 1959, Ser. No. 809,797
Claims priority, application Germany May 22, 1956
14 Claims. (Cl. 204—322)

The present invention relates to an apparatus for generating ozone by means of silent or corona electric discharges between plate electrodes, and more particularly, to an ozone generating apparatus in which stabilizing dielectric layers are interposed between the plate electrodes.

The application is a continuation-in-part of my copending application Serial No. 660,679, filed May 21, 1957, now abandoned.

One of the objects of the present invention is to provide a simplified design of an apparatus of the general kind above referred to.

Another object of the invention is to provide a novel and improved ozone generating apparatus of the general kind above referred to, which has a cooling system such that batteries composed of a large number of pairs of electrodes can be operated without causing an elevation of the temperature that may adversely affect the yield.

Still another object of the invention is to provide a novel and improved ozone generating apparatus in which the ozonization can be carried out under higher pressure than was heretofore practical. An operation at such elevated pressure is desirable, for instance, in water ozonization installations in that it permits saturation of water under pressure with ozone without intermediate relief of the pressure. The resulting elimination of pressure relief devices affords the advantage of simplifying the entire installation. Furthermore, it is not necessary to discharge the circulating ozonization gas into the atmosphere and the increased solubility of ozone at elevated pressure can be fully utilized.

As is well known, the generation of ozone is not possible without converting to heat the major portion of the input of electrical energy. (See Theodor Rummel, "Hochspannungsentladungschemie und Ihre Industriele Anwendung," Munich, 1951, published by R. Oldenbourg und Hanne Reich, page 159, penultimate paragraph and page 274, the paragraph following the table.) As a result, it has been found necessary to provide complicated cooling systems in ozone generating apparatus employing plates as heretofore known, for instance, hollow electrodes through which water is circulated, or the load on the batteries of plates had to be held low to prevent or at least to impede an elevation of the temperature adversely affecting the yield.

As to the pressure conditions in the discharge zone, the heretofore accepted theory was that the highest yields could be obtained at atmospheric pressure and that operation at materially higher pressure was uneconomical. (See, for instance, Rummel, page 159, in the previously mentioned publication and the paper by Wartenburg und Treppenhauer in the "Zeitschrift für Electrochemie," volume 31, 1925, pages 633 to 635.)

The inventor herein found that high pressures can be advantageously utilized by providing a narrow slot for the flow of gas. In addition to the previously mentioned advantages, such an arrangement affords the advantage that it utilizes the principle of Le Chatelier according to which ozone is formed at a lower input of energy when high pressures are applied.

According to the invention the arrangement of an ozone generating apparatus of the general kind above referred to, is such that stacked pairs of electrodes and interposed layers of dielectric material in the form of ring discs are disposed as a battery of plates within a metallic tubular cooling jacket. The peripheral rim of one electrode of each pair is in good heat conducting contact with the jacket wall and the gas to be ozonized (air or oxygen) is fed into the apparatus through a common center duct defined by the plates, then conducted through the discharge zone formed by narrow slots left between the plates and finally discharged through discharge ducts provided next to the wall of the cooling jacket. The points of admission and discharge of the gas to be ozonized can also be reversed.

As will be demonstrated by the subsequent data and calculations, the cooling of the tubular jacket, for instance by a flow of water, is in itself already sufficient to produce a sufficient cooling of the entire installation without a specific cooling of the individual electrodes. As a result of arranging the electrodes and the interposed layers of dielectric material in the form of plane bodies, it is readily possible to make the slots in the discharge zone very uniform and narrow, for instance, by utilizing plane-ground dielectric discs which are separated from each other by thin small spacer plates. As a result of the aforedescribed arrangements, all conditions are created for advantageous operation under pressure.

The use of plane electrodes and dielectric spacers also eliminates the difficulties which have been encountered in providing narrow flow passages in ozone generating apparatus employing tubes thereby making practical the highly desirable operation under pressure. It is very difficult in practice to fit into each other tubes true to size and dielectric layers while maintaining uniform narrow spaces therebetween.

In order to utilize fully the electrode plates in contact with the wall of the cooling jacket for dissipation of heat, it is advantageous to provide as ring-shaped electrodes self-supporting metal plates of sufficient thickness. According to a preferred embodiment of the invention the electrode plates in contact with the cooling jacket are electrically insulated from the other electrodes by rings of insulation material fitted on the inner periphery of these plates, whereas the second or counter electrodes of each pair which are not in contact with the cooling jacket wall are similarly electrically insulated from the wall of the cooling jacket.

Other and further objects, features, and advantages of the invention are pointed out hereinafter and set forth in the appended claims forming part of the application.

In the accompanying drawing two preferred embodiments of the invention are shown by way of illustration and not by way of limitation.

In the drawings:

FIG. 3 is a sectional view similar to FIG. 1 of a modification of the battery of plates, and FIG. 4 is a diagrammatical sectional view of an ozonizing installation, including an apparatus according to the invention.

Figure 1:
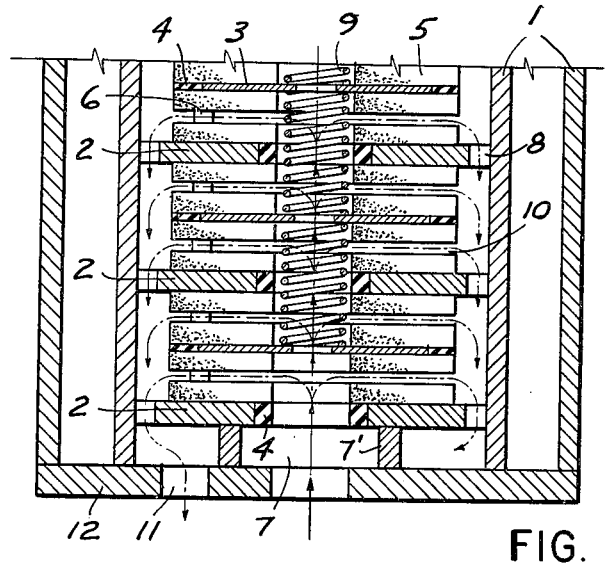
FIG. 1 is a diagrammatic sectional view of an apparatus for generating ozone in accordance with the invention.
Figure 2:
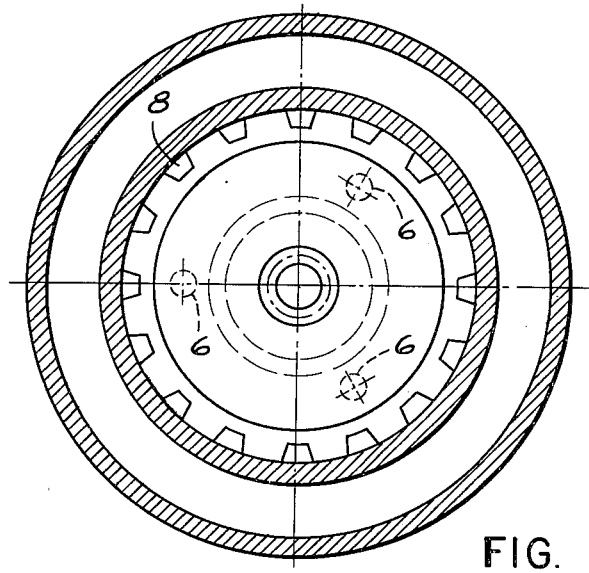
FIG. 2 is a sectional plan view of FIG. 1.

Referring first to FIGS. 1 and 2 in detail, the apparatus according to this figure comprises a battery of plates disposed within a cooling jacket 1. This jacket is shown as being formed of two concentric tubes made, for example, of aluminum. The coolant, such as water, is passed between the two walls of the jacket.

The battery comprises one or preferably several pairs of electrode plates 2, and counter-electrode plates 3, two complete pairs and one incomplete pair being shown by way of example. Each electrode 2 consists of self-supporting ring shaped aluminum discs in good heat conducting contact with the cooled jacket 1. They may be welded to the jacket or the inner tube of the jacket may be shrunk or force fitted upon the electrodes. The counter-electrodes 3, are shown as consisting of thinner ring-shaped aluminum discs which do not touch the inner tube of jacket 1. Insulation rings 4 made of a suitable material resistant to ozone line the inner peripheral rim of electrodes 2 and similar rings 4' line the outer peripheral rim of electrodes 3. These rings 4 and 4' serve to prevent break-throughs of the potential between the electrodes. Each of the electrodes 2 and 3 is covered on both sides with ring-shaped plane discs 5 of insulation material such as glass, but preferably made of a ceramic material having a high dielectric constant and containing alkaline earth titanate or other titanium compounds. Spacers 6 are interposed between the respective dielectric discs 5 to form passageways 10 therebetween as clearly shown in FIG. 2 and to fix the width of the slots.

The gas to be ozonized is admitted through a central duct 7 defined by the stacked ring discs 2, 3 and 5 and a ring sleeve 7'. The gas passes from the center duct through the narrow slots 10 which constitute the ozonization zone and is discharged from this zone through ducts or channels 8 and a duct 11 in bottom plate 12, formed about the inner periphery of the inner tube of jacket 1. FIG. 1 indicates the flow direction of the gas by arrows, but the flow direction of the gas may also be reversed by admitting the gas through ducts 8 and discharging it through central duct 7. The gas may be admitted into duct 7 from either end, admission from the bottom being shown. To force the flow of gas through slots 10, the end plate of the battery at the end opposite to the ingress end may be closed. The ozonizing battery is energized by an A.-C. voltage as customary.

The current is supplied to the apparatus through jacket 1 serving as ground connection and a wire 9 connecting the counter-electrodes 3 through the center duct 7. Wire 9 is preferably insulated with an insulation material resistant to ozone such as polyethylene. The use of dielectric layers having a high dielectric constant eliminates the necessity of operating at high frequencies. The usual line frequencies, for instance, 50 or 60 cycles per second, are adequate. The operational voltage is between 6 and 20 kv. as customary.

The battery of plates according to FIG. 3 is similar in principle to that of FIG. 1, except that the electrodes 3', that is, the electrodes which are not in contact with the cooling jacket 1' are covered on both sides with heavy layers of insulation material 5', whereas electrodes 2', that is, the electrodes which are in contact with the cooling jacket are left blank. Current is supplied to electrodes 3' connected by wires 32 to a bus bar 31. The central opening of the electrodes 2' has a diameter substantially greater than that of the dielectric plates 3'. This affords the advantage of efficiently preventing or at least strongly impeding arcing between the electrodes since the arcing gap around the dielectric material is too wide to permit arcing.

The apparatus may be operated at a super pressure of several atmospheres, for instance, 5 to 20 atmospheres, whereby the width of the passage slots in the discharge zone is preferably between 0.1 to 0.4 mm. If a material having a high dielectric constant is used, for instance, a ceramic material containing titanium compounds, an increase of the operational frequency is not necessary. Under all circumstances the dielectric layers should be made of a low loss material.

According to a preferred embodiment the coolant used for cooling the jacket is maintained at approximately the same pressure as the interior of the apparatus, whereby a thin walled aluminum tube may be used for the inner wall of the jacket without danger of an outward bulging of this tube by the internal pressure.

In order further to explain the invention several data for the operational conditions within the apparatus are now given. Let it be assumed that the dimensions of the apparatus according to FIG. 1 are so selected that in each slot between the dielectric plates one gram of ozone per hour is generated from oxygen. The electric load "Q" required for such yield is about 10 watt as it is usually in ozone generating devices. As each one of the electrodes 2 in contact with the jacket has a slot on both sides twice this load must be conducted to the jacket, disregarding the portion conducted by the gas itself and the dielectric layers. In any event, the heat conductivity, the thickness and the ratio of the radii must be correlated by taking in account the following considerations and conditions:

The heat conducting electrodes 2 are maintained at their outer periphery at the temperature of the cooling jacket whereas the inner rim will be somewhat warmer due to the continuous take-up of energy. The temperature gradient between the inner and the outer rim of the electrodes is defined as $\Delta T$. Let it now be assumed that the entire energy is absorbed at the inner rim of the electrodes and transported radially outwardly. For such a theoretical condition $\Delta T$ can be conveniently calculated from the well known equation for the heat conductivity of coaxial cylinders.

As can be ascertained from the above-indicated calculations, the temperature of the electrodes which are in direct contact with the cooling jacket will not be more than 7° C. above the temperature of the water-cooled cooling jacket at any point of the surface of the electrodes. In actual practice, the temperature differential will probably be less. Such a moderate temperature differential between the temperature of the electrodes and the temperature of the cooling jacket will not cause an appreciable reduction in the yield of the ozone and is hence acceptable. It can further be shown by calculation that the temperature of the dielectric plate above a heat conducting electrode cannot become elevated by more than about 1° C. above the highest temperature of the electrode and consequently can reach at the most 7+1°=8° C. above the temperature of the cooling jacket, probably considerably less. The thin layer of gas which was assumed to be the sole source of heat in the above considerations and which, hence, must have the highest temperature occurring in the entire installation cannot become warmer for all practical purposes than the dielectric plate in contact with it due to the gas turbulence within the layer. In other words, in the apparatus according to the invention, the temperature differential between the temperature of the gas layer and the temperature of the coolant cannot exceed 8° C. as was to be demonstrated.

In the apparatus of FIG. 3 in which blank heat discharging electrodes are utilized the conditions are obviously still more favorable.

FIG. 4 shows the embodiment of an apparatus according to FIG. 1 in an ozone generating installation. Corresponding components are designated by the same reference numerals. As is shown in FIG. 5, the cooling jacket 1 of the apparatus is closed at its upper end and a cover plate 13 is mounted upon the apparatus and secured thereto by means of screws 23. A sealing ring 14 is interposed between cover plate 13 and the cooling jacket. A spacer ring 15 serves to hold the array of plates in position.

The cover plate 13 mounts an insulation bushing 16 which is held in position by means of a nut 18 screw-threaded upon it. A sealing ring 24 is interposed between the bushing and the cover plate. Current is supplied by means of a lead-in wire 17 extending through the bushing and connected to the secondary of a transformer 27 which supplies the necessary high voltage and is connected to power lines 28.

Gas is supplied through an inlet 22 and discharged through an outlet 21. Inlet 22 is connected to a supply of oxygen shown as bottle 29. The cooling water is circulated through the jacket by means of an inlet 19 and an outlet 20.

The type of installation in which the apparatus according to the invention is embodied, is entirely conventional and does not constitute part of the invention.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An ozone generating apparatus, comprising at least one pair of stacked ring-shaped electrode, plates, a ring-shaped insulation body interposed between said electrodes electrically separating the same, the inner peripheral rim of said electrodes and said insulation body defining a common inner duct, a metallic tubular cooling jacket, the battery formed by said electrodes and said insulation body being disposed within said tubular jacket, one electrode of said pair being in intimate heat and current conducting contact with said jacket, the outer peripheral rim of the other electrode and of the insulation body in conjunction with the inner wall of said jacket defining an annular outer duct, said one electrode having a passage opening in its marginal portion protruding into the outer duct, said insulation body including a passageway communicating with said inner duct and said outer duct whereby said ducts and said slot form a continuous flow path for gas to be ozonized in which said passageway constitutes a discharge zone, and circuit means connected to said other electrode for applying a potential to the electrodes to effect a corona discharge between the electrodes.

2. An ozone generating apparatus, comprising at least one pair of stacked ring-shaped electrode plates, two ring-shaped layers of dielectric material interposed between said electrodes, said dielectric layers being axially spaced apart to form a narrow radially extending passageway therebetween, the inner peripheral rim of said electrodes and of said dielectric layers defining a common inner duct, a metallic tubular cooling jacket, the battery formed by said electrodes and said dielectric layers being disposed within said tubular jacket, one electrode of said pair being in direct heat and current conducting contact with said jacket, and circuit means connected to the other of said electrodes for applying a potential to the electrodes to effect a corona discharge between the electrodes, said passageway forming a discharge zone.

3. An apparatus according to claim 2, wherein each of said dielectric layers is in intimate heat conducting contact with one side of the respective electrode.

4. An apparatus according to claim 1, wherein said electrode in intimate heat and current conducting contact with the jacket comprises a self-supporting metal plate of a thickness greater than the other electrode.

5. An apparatus according to claim 1, wherein the inner peripheral rim of the electrode in intimate contact with the jacket and the outer peripheral rim of the other electrode are lined with insulation material.

6. An apparatus according to claim 2, wherein each of said layers of dielectric material is in the form of plane-parallel ring-shaped plates and wherein each of said electrode plates is sandwiched between two dielectric plates, said slot being formed between the two dielectric plates disposed between the two electrodes.

7. An apparatus according to claim 2, wherein each of said layers of dielectric material is in the form of plane-parallel ring-shaped plates, and wherein the electrode in intimate contact with the jacket is blank and the other electrode is sandwiched between two dielectric plates.

8. An apparatus according to claim 1, wherein the width of the passageway is between 0.1 to 0.4 mm.

9. An apparatus according to claim 1, wherein said insulation body is made of ceramic material having a high dielectric constant and low losses.

10. An apparatus according to claim 1, wherein said insulation body is made of synthetic material containing a titanium compound.

11. An apparatus according to claim 1, wherein said circuit means comprises the metallic jacket as the one feed conductor connected to said electrode in intimate contact with the jacket and a wire connected to the other electrode through said inner duct as the second feed conductor.

12. An apparatus according to claim 11, wherein said wire is covered with an insulation material resistant to ozone.

13. An apparatus according to claim 1, wherein said jacket comprises a double wall defining an annular cooling space therebetween for the passage of a coolant, said one electrode being in contact with inner wall.

14. An ozone generating apparatus comprising several pairs of stacked ring-shaped plate electrodes, a pair of ring-shaped insulation layers interposed between the two electrodes of each pair, each pair of insulation layers being separated by a narrow radially extending passageway, the inner peripheral rims of said electrodes and of said insulation layers defining a central duct, a metallic tubular cooling jacket, the stack formed by said electrodes and layers being disposed within said jacket coaxially therewith, one electrode of each pair abutting against the inner wall of said jacket in heat and current conducting contact therewith, the outer rim of the other electrode of each pair and of the insulation layers in conjunction with the inner wall of the jacket defining an outer annular duct, each of said radial passageways connecting the inner duct with the outer duct, each of said electrodes abutting the jacket having in its marginal portion protruding into the outer duct a passage opening whereby said ducts and said passageways form continuous flow paths for the ozone in which each passageway constitutes a discharge zone, and circuit means interconnecting said other electrodes for applying a potential to the electrodes to effect a corona discharge between each pair of electrodes.

References Cited in the file of this patent

UNITED STATES PATENTS

| 632,391 | Abraham et al. | Sept. 5, 1899 |

FOREIGN PATENTS

| 677,897 | Great Britain | Aug. 27, 1952 |